United States Patent Office 3,270,881
Patented Sept. 6, 1966

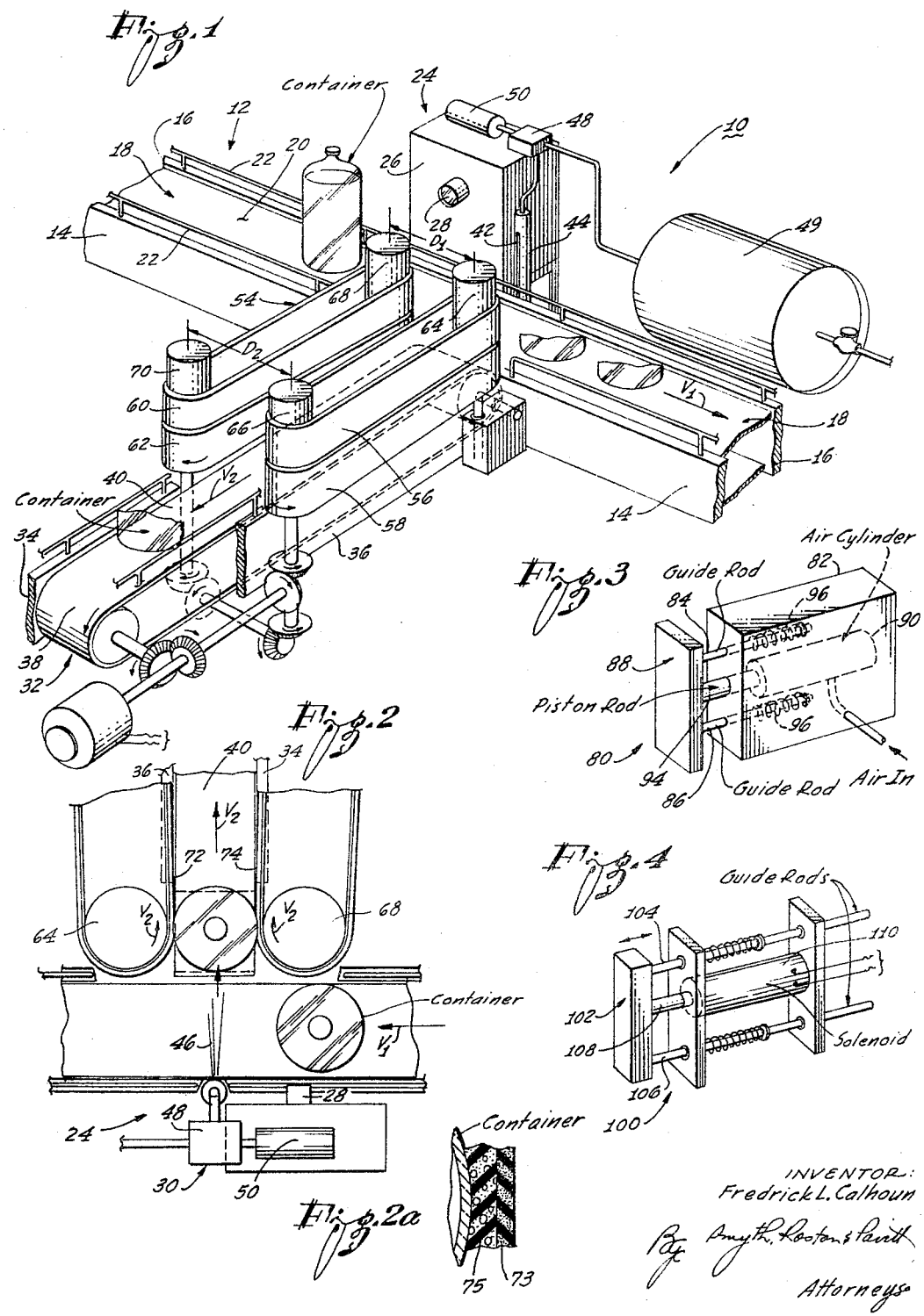

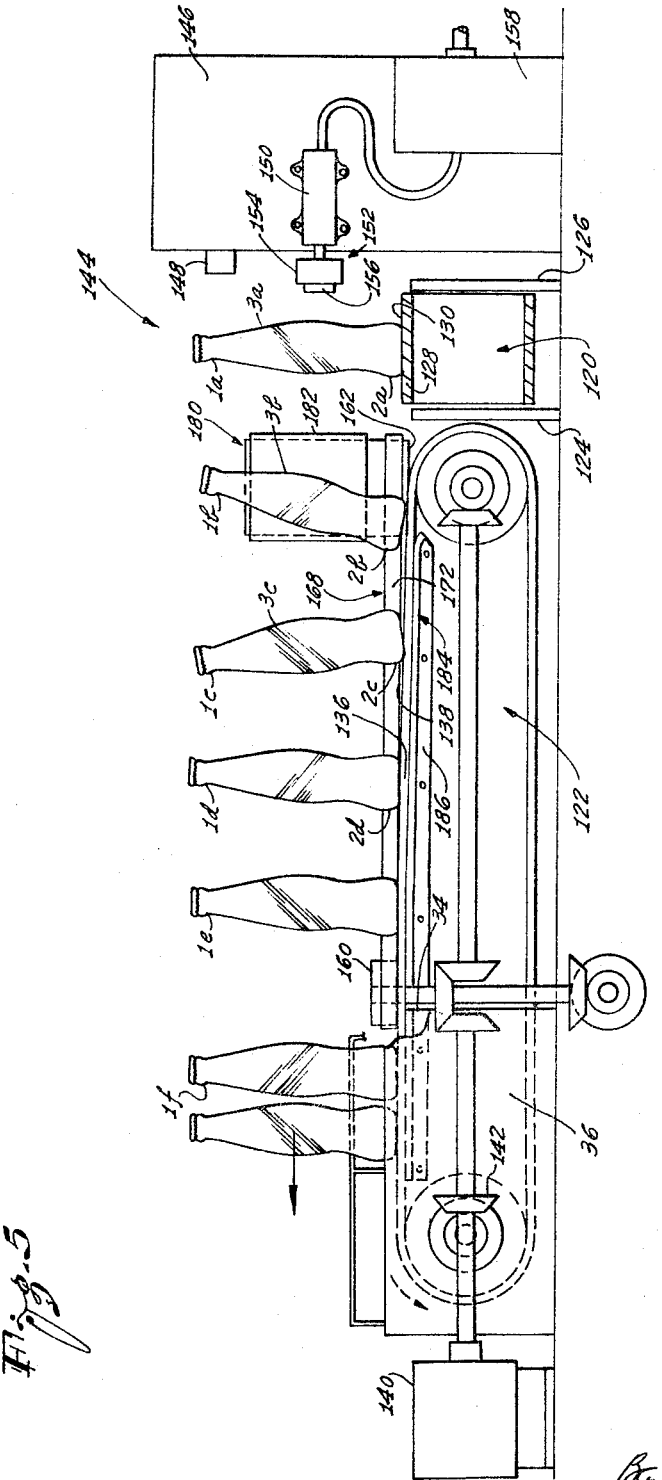

3,270,881
MATERIAL HANDLING SYSTEM
Fredrick L. Calhoun, Torrance, Calif., assignor to Electro-Dynamics Corp., a corporation of California
Filed Jan. 27, 1964, Ser. No. 347,989
16 Claims. (Cl. 209—74)

This is a continuation-in-part of my earlier filed application Serial No. 335,572 entitled "Material Handling System," filed January 3, 1964, assigned to Industrial Dynamics Company, Ltd., now abandoned.

The present invention relates to material handling means, and more particularly to means for transferring workpieces to a plurality of different locations.

In numerous types of mechanized operations, conveyor systems are provided for transporting workpieces between different locations. In such conveyor systems, it is frequently necessary to switch workpieces from a primary conveyor to a secondary conveyor whereby some of the workpieces go to a first location and some of the workpieces go to a second location. For example, in packaging operations such as in filling bottles, it is necessary to inspect and separate the bottles according to size, color, shape, defects, the volume of the container, etc. To accomplish this inspection, means are provided that scan the bottles for the desired characteristics as they move along a primary conveyor between successive stations. In the event a bottle having the characteristic is sensed, it is switched from the primary conveyor to a secondary conveyor. Heretofore, considerable amounts of effort have been devoted toward satisfactory switch means for diverting the bottles from one conveyor to another conveyor. Although means have been provided that are capable of accomplishing this objective, they have been unreliable in operation, subject to numerous operating difficulties, very complex, expensive and also have not been capable of operating at very high rates of speed.

It is now proposed to provide material handling or transfer mechanism which overcome the foregoing difficulties. More particularly, it is proposed to provide a transfer means which is not only simple and inexpensive, but is also very reliable and can be operated at very high rates of speed. This is accomplished by providing primary and secondary conveyors that are disposed adjacent each other with an inspection station for scanning the workpieces as they are transported along the primary conveyor. The inspection station includes means for ejecting the workpieces having the predetermined characteristic from the primary conveyor and along a predetermined path. Catching means are disposed on this path and adjacent the secondary conveyor for catching the workpieces and placing them on the secondary conveyor.

These and other features and advantages of the present invention will become readily apparent from the following detailed description of several different embodiments of a transfer mechanism embodying the invention and particularly when taken in connection with the accompanying drawings wherein like reference numerals refer to like parts, and wherein:

FIGURE 1 is a perspective view of a transfer mechanism embodying one form of the present invention;

FIGURE 2 is a plan view of a portion of the transfer mechanism of FIGURE 1;

FIGURE 2a is a fragmentary cross-section of a portion of the transfer mechanism;

FIGURE 3 is a perspective view of a modification of a portion of the transfer mechanism;

FIGURE 4 is a perspective view of a further modification of the transfer mechanism; and FIGURE 5 is a side view of a transfer mechanism embodying another form of the present invention.

Referring to the drawings in more detail, and particularly FIGURES 1 and 2, the present invention is especially adapted to be embodied in a transfer or conveyor system 10 for transferring workpieces from one station to one or more subsequent stations.

Although the workpieces may be of any desired variety, in the present instance the conveyor system 10 is particularly adapted to transfer a series of glass bottles 1. These bottles 1 normally have a substantially round body with a restricted neck on the top and a flat base 2 on the bottom. The base 2 is substantially planar so that the bottle 1 may rest on the base 2 and be supported in a vertical position. The outside diameter of the base 2 of the bottle 1 is normally equal to the maximum outside diameter of the bottle 1. In addition, the bottle 1 normally includes an enlarged portion 3 near its top that has an outside diameter equal to the diameter at the base 2. As a result, when the bottle 1 is next to another bottle, the two bottles will contact each other at their bases 2 and at an elevated point. This will provide a stability that will prevent the bottles being upset.

The conveyor system 10 includes a primary conveyor 12 that extends from one station to a subsequent station. The conveyor 12 includes a rigid framework having a pair of side rails 14 and 16. The upper edges of the side rails 14 and 16 may be separated so as to form an upwardly open space.

An endless belt 18 is disposed between the two side rails 14 and 16 so that the upper surface of the belt 18 will be exposed through the open space. The conveyor belt may be of any conventional design such as a flexible fabric belt or a metal link belt. The exposed portion of the conveyor forms a substantially horizontal workpiece supporting surface 20 for carrying the workpieces. The bottles may have their bases seated upon this surface 20 whereby the bottles will be in a vertical position with their necks pointed upwardly. It may thus be seen that a train or series of bottles may be seated in a vertical position on the work surface 20 on the top of the conveyor 12.

A motor is interconnected with the conveyor belt 18 so as to cause the exposed surface 20 to move from one work station toward a subsequent station. The bottles on the conveyor will thus move toward the subsequent station at a first velocity $V_1$ that is equal to the velocity of the conveyor belt 18. In the present conveyor system 10, the bottles may be moved at a rate that is in excess of 1,000 bottles per minute. Since such a high rate of speed will produce some vibrations in the bottles, it is desirable to provide one or more side rails 22 on the opposite sides of the conveyor belt 18. These rails 22 will be at about the height of the enlarged portions 3 and will be effective to prevent the bottles being upset and falling off of the conveyor 12.

A separating station 24 may be disposed adjacent to the conveyor 12 for individually scanning each of the bottles in the series or train of bottles carried by the conveyor belt 18.

The separating station 24 includes an inspection device or detector 26 that is positioned adjacent to the train. Thus, each bottle will have to move the past detector 26 in very close proximity thereto. The detector 26 may be of any desired variety such as that disclosed and claimed in copending application Serial No. 199,382 filed June 1, 1962, now Patent No. 3,225,191.

More particularly, the detector 26 includes a photoelectric optical system having a lens 28 that is positioned to focus on the bottles 1 carried by the conveyor 12. This lens 28 and the remaining portions of the photoelectric system are particularly adapted to sense some predetermined characteristic of the bottle. For example, it may detect the size, shape, color, etc., of the bottle.

Also, the detector 26 may be adapted to inspect the bottles to determine whether or not they have some defect such as a crack or chip or whether or not they are properly filled. Whenever a bottle 1 having the particular characteristic being sensed is carried past the detector 26, the detector 26 will produce an electrical signal. Normally, bottles not having the particular characteristic may move past the detector 26 without causing the detector 26 to produce any sort of electrical signal.

In addition to the detector 26, the separating station 24 includes transfer means 30. The transfer means 30 is interconnected with the detector 26 so as to be responsive to the electrical signals, produced thereby. Each time a signal occurs, the transfer means 26 will transfer a workpiece such as the bottles from the first or primary conveyor 12 to a secondary conveyor 32.

The secondary conveyor 32 may be similar to the first conveyor 12. More particularly, it includes a pair of side rails 34 and 36 that are separated from each other so as to form an upperly directed open space. An endless belt 38 may be disposed between the two side rails 34 and 36 whereby the belt 38 will be exposed through the opening. The top of the belt 38 will form a work supporting surface 40 similar to the supporting surface 20 on the first conveyor belt 18 so that the workpieces such as bottles may be seated thereon. One end of the conveyor 32 is disposed adjacent to the side of the first conveyor 12 and to the transfer means 30. In addition, the two conveyors 12 and 32 are at substantially the same heights.

A drive motor may be interconnected with the second conveyor 32 for driving the belt 38. The belt 38 is driven so that the upper surface 40 will be moving away from the first conveyor 12 at a velocity $V_2$. For reasons that will become apparent subsequently, it is desirable for the second velocity $V_2$ to be greater than the first velocity $V_1$.

Although the transfer means 30 may be of any suitable variety, in the present instance it is of the pneumatic type and includes an air jet 42 which is effective to direct a blast of air transversely across the conveyor 12. The present jet 42 is formed by a pipe 44 that is disposed adjacent to the conveyor 12 in a substantially vertical position. For reasons that will become apparent subsequently, it is desirable for the pipe 44 to be adjustable in a vertical direction so that it can be moved up and down relative to the workpieces on the conveyor 12. The pipe 44 includes one or more openings through which compressed air may flow at a high velocity. These openings are effective to form the air jet 42. In this embodiment, the opening or jet 42 is in the form of an elongated vertical slot.

When compressed air is fed into the pipe 44, it will escape from the slot as an air blast 46 in the form of a substantially vertical sheet of high velocity air. This blast 46 of air will be traveling substantially normal to the conveyor belt 18 and will impinge against the side of the bottle that has just passed the detector 26.

The position of the pipe 44 is normally adjusted vertically so that the blast 46 will be positioned substantially symmetrically about the center of percussion of the bottle. The center of percussion is the point at which a percusssive blow against a freely suspended body will cause the body to move in pure translation in a direction parallel to the direction of the force. This will cause the bottle to remain in its vertical position when it is propelled from the conveyor 12. As a practical matter, the bottles are not freely suspended but rest on the support surface 20. As a consequence, there is a small amount of friction on the bottom of the bottle which will tend to tip the bottle over. In order to compensate for this effect, the pipe 44 may be adjusted vertically so that the blast 46 of air will act against the bottle at a point slightly below the center of precussion.

It will thus be seen that if a bottle is positioned on the conveyor belt 18 in line with the jet 42 at the time compressed air is supplied to the pipe 44, the blast of air will cause the bottle to be propelled along a predetermined path and while the bottle is moving in this manner it will remain in a substantially vertical position. Normally, the path the bottle 1 will follow will be aligned with the second conveyor 32.

The flow of air into the pipe 44 and through the jet 42 is controlled by a suitable air valve 48. This valve 48 is pneumatically interconnected with a source 49 of compressed air and the pipe 44. The valve 48 is preferably of the fast acting type so that it can open and close very quickly. This will be effective to cause the blast 46 of air to start and stop very rapidly whereby the blast will require a minimum amount of air.

In order to control the operation of the valve 48, a solenoid 50 is provided. In the present instance the solenoid 50 is disposed immediately adjacent the valve 48. The solenoid 50 is mechanically connected to the valve 48 and electrically connected to detector 26. As a result, each time a workpiece such as a bottle passes in front of the detector 26 and has the characteristic that the detector 26 senses, the detector 26 will feed a signal to the solenoid 50. This signal will cause the valve 48 to momentarily open and allow a blast 46 of air to release from the jet 42. This blast 46 will be effective to cause the bottle having the characteristic to be propelled from the conveyor belt 18 and along the predetermined path.

Normally, the jet 42 will be disposed very close to the bottles so that the blast 46 of air will strike the bottle with a very high velocity. This will permit an efficient use of the air and will percussively strike the bottle so that it will be propelled along its path. Thus, the bottle will continue to move at a substantial velocity even after the air blast 46 is no longer acting on the bottle.

Suitable means may be disposed in the path of the workpieces or bottles so as to catch the workpieces or bottles as they are propelled along its path. This catcher 54 may be any means that will receive the bottle after it has been propelled along the path and to then place the bottle on the secondary conveyor 32 in a vertical position.

In the present instance, the catcher 54 includes a pair of surfaces that are symmetrically disposed about the path that will be followed by the bottles. These surfaces may be the peripheries of a pair of wheels disposed in horizontal planes. The peripheries are juxtaposed to each other above the conveyor belt 38 so as to catch the bottles adjacent the base 2 and enlargement 3.

However, in the present instance belt means are provided for catching the bottles. The belts 56, 58, 60 and 62 are mounted on pairs of pulleys 64 and 66 and 68 and 70 disposed on the opposite sides of the conveyor 32. The pulleys 64 and 66 and 68 and 70 on the opposite sides of the conveyor belt 38 are counter rotating whereby the registering sides 72 and 74 of the belts, i.e., the sides closest to each other, are trvaeling in the same directions as each other and as the conveyor belt 38. A single wide belt or a pair of belts may be employed on each side of the conveyor 32 to engage the bottles at the enlarged portion at the base 2 of the bottle 1 and the enlarged portion 3 near the top. If an assortment of bottles are to be separated, the height of the upper belt may be adjustable so as to always be aligned with the enlarged portion 3.

The first pair of pulleys 64 and 68 are separated by distance $D_1$ so as to cause the registering surfaces 72 and 74 to be separated by a distance that is less than the outside diameter of the bottle. As a consequence, if a bottle passes between the belts 56 and 58 and 60 and 62, the bottle will be compressed therebetween and firmly gripped. However, the second pair of pulleys 66 and 70 are separated by a slightly greater distance $D_2$. As a consequence, if a bottle is compressed between the belts 56 and 58 and 60 and 62 and carried thereby, the amount of compression will gradually decrease until the bottle is substantially free or completely released at or about the time it reaches the ends of the registering surfaces 72 and 74.

The belts 56 and 58 and 60 and 62 are preferably centered about the path that the bottles will follow as they are propelled from the conveyor 12. It will thus be seen that any bottles that are removed from the conveyor 12 by the transfer means 30 will be caught by the belts 56 and 18 and 60 and 62 and carried away.

The pulleys 64 and 66 and 68 and 70 are interconnected with the conveyor belt 38 or the drive means therefor so that the registering surfaces 72 and 74 will be traveling parallel to and at the same velocity as the work supporting surface 40 on the conveyor belt 38. This will insure that a bottle being carried by the belts 56 and 58 and 60 and 62 will not be moving relative to work surface 40. As a result, the belts will be effective to catch the bottles and carry them along over the moving conveyor belt 38 until the bottles are properly seated on the surface 40 and stabilized so as to be capable of supporting themselves.

Preferably the velocities $V_2$ of the second conveyor 38 and the belts 56 and 58 and 60 and 62 are substantially higher than the velocity of the primary belt 18. As a consequence, the spacing between the bottles transferred to the second conveyor 32 will be greater than the spacing of the bottles on the first conveyor 12. Thus, if a series of abutting bottles on the first conveyor 12 are transferred to the second conveyor 32, they will no longer touch each other. Instead, they will be separated by spaces that are dependent upon the difference in velocities of the belts 18 and 38. A bottle caught between the belts 56 and 58 and 60 and 62 will be moved a substantial distance from the catch position before the next bottle in an abutting train of bottles can be propelled from the conveyor 12 by the blast 46 of air. This will be effective to space the bottles so that they will not be smashed by the successive transfer of subsequent bottles.

In order to operate the present conveyor or transfer system 10 to process a series of bottles, the bottles may be loaded onto the primary conveyor 12 at a first work station. This station may perform an operation such as loading a random collection of empty bottles onto the conveyor 12 or it may perform an operation such as filling the bottles, etc. The conveyor 12 will then move all of the bottles in the series toward a second work station. It should be noted that all of the bottles in the series will be in a vertical position with their bases resting on the surface 20 of the conveyor belt 18.

Before the bottles reach the next work station, each and every bottle in the series must first pass through the separation station 24. In the process of doing this, each bottle will be scanned by the detector 26 so as to sense some particular characteristic of the bottles. For example, if all of the bottles are empty, the detector 26 may be set to detect whether the bottles are of some particular color and/or of some particular shape. If the bottles have just been filled the detector 26 may be set to detect whether the bottles are adequately filled.

Bottles not having the particular characteristic for which the detector 26 is set will move past the detector 26 without causing the detector 26 to produce any signals. As a result, the solenoid 50 will not be energized and the valve 48 will not be actuated. As long as the valve 48 remains closed, no air will be released from the jet 42 and the conveyor 12 will carry the bottle through the separation station 24 and on to the next work station.

Any bottles in the series having the particular characteristic will also be carried past the detector 26. When such a bottle reaches the detector 26, the detector 26 will sense the characteristic and produce an electrical signal. This signal will be fed to the solenoid 50 so as to energize the solenoid 50 to a sufficient level to cause the air valve 48 to be opened. When the solenoid valve 48 opens, air will flow from the source 49 to the pipe 44 so as to be released from the jet 42.

The air released through the jet 42 will form a high velocity blast 46 of air at substantially right angles to the conveyor 12. The detector 26 and solenoid 50 are effective to time the blast 46 so that it will occur while the bottle having the preselected characteristic is aligned with the jet 42. As a result the blast 46 of air will thus strike the side of the preselected bottle and produce a sufficient force on the bottle to eject or propel the bottle laterally from the conveyor 12 and along the preselected path. Preferably, the jet 42 is positioned so that the blast 46 of air will hit the bottle at a location and direction that will insure the bottle remaining in a substantially vertical position and moving in a straight line that extends between the registering surfaces 72 and 74 of the belts 56 and 58 and 60 and 62.

Because of the larger diameter of the bottle, it will engage both of the moving registering surfaces 72 and 74 on the inner sides of the belts. The belts include a relatively rigid backing 73 and a soft facing 75 that may be compressed by the bottles. This will permit the bottles being tightly compressed between the surfaces so that the belts 56 and 58 and 60 and 62 will then carry the bottle. It may thus be seen that the belts 56 and 58 and 60 and 62 will catch the bottles on the "fly."

The registering surfaces 72 and 74 on the belts 56 and 58 and 60 and 62 move at a velocity $V_2$ equal to or greater than the velocity at which the bottle enters the space between the belts 56 and 58 and 60 and 62. As a consequence, the vertical alignment of the bottle will not be materially altered. Moreover, if the bottle has been struck by the blast of air so that the bottle is starting to rotate in a vertical plane, as soon as the bottle hits the belts 56 and 58 and 60 and 62, it will be prevented from rotating any further. As a consequence, the belts 56 and 58 and 60 and 62 will firmly hold the bottle and dissipate any annular momentum which is tending to upset the bottle.

As the belts 56 and 58 and 60 and 62 continue to rotate, the bottles will be carried between the two registering surfaces 72 and 74. The conveyor belt 38 is positioned so that the base of the bottle will come to rest on the work surface 40. Thus, the bottle will become supported by the conveyor 32. As the belts carry the bottle, the two surfaces 72 and 74 will gradually diverge so that the force holding the bottle will gradually decrease until the bottle is completely released from the belts and carried entirely by the conveyor 32. The velocity of the conveyor 32 and the velocity of the belts 56 and 58 and 60 and 62 are identical. As a consequence, there will be no upsetting forces acting on the bottle at the time it is released. As a result, the bottles will remain in the vertical position on the second conveyor 32 as they are carried away.

Normally, the bottles on the conveyor 12 will be abutting against each other. If two or more of the consecutive bottles in the series have the particular characteristic being sensed by the detector 26, the bottles will be consecutively and rapidly transferred to the second conveyor 32. If the bottles remain in a contacting relation on the second conveyor 32, the succeeding bottle will be smashed against the preceding bottle at a high velocity by the air blast 46. This, in turn, will cause one or both of the bottles to break and/or a malfunction of the transfer apparatus. In order to avoid this difficulty, the second conveyor belt 38 and the belts 56 and 58 and 60 and 62 are driven at a speed $V_2$ that is considerably faster than the speed $V_1$ of the first conveyor 12. This will insure that belts 56 and 58 and 60 and 62 carry a bottle a sufficient distance to prevent the next bottle being propelled against it.

It has been found that the foregoing embodiment is capable of transferring preselected workpieces to a second conveyor at a high rate of speed. The blast 46 of air can be made to operate at a high repetition rate and is very effective to propel workpieces such as bottles and particularly empty bottles. However, under some circumstances it may be desirable to employ the transfer means 80 shown in FIGURE 3. This transfer means 80 is adapted to produce larger forces suitable for transferring heavier workpieces such as large or filled bottles.

In this embodiment, the transfer means 80 includes a housing 82 that is adapted to be mounted in the separate station 24 adjacent the detector 26. A pair of substantially parallel guides 84 and 86 are slidably disposed in the housing 82 adjacent the top and bottom thereof.

A ram or percussion bar 88 is secured to the two guides 84 and 86 so as to be carried thereby. This bar 88 includes a resilient or soft surface that may be impacted against the workpieces without damaging the workpiece. The bar 88 is positioned in alignment with the secondary conveyor 32 so that when it is carried outwardly along the guides 84 and 86, it will cause the workpieces to be propelled into the space between the registering surfaces 72 and 74. A pneumatic cylinder 90 is included inside of the housing 82 with a piston disposed inside thereof. The piston is connected to the bar 88 by means of a piston rod 94. Springs 96 may be interconnected with the guides 84 and 86 and/or piston rod so as to normally retain the bar 88 in a retracted position. The cylinder 90 may be interconnected with the valve 48 whereby compressed air will enter the cylinder 90 when the valve 48 opens. This will force piston and the bar 88 outwardly at a high velocity.

It will thus be seen that when the detector 26 senses the passage of a workpiece having the preselected characteristic, the detector 26 will cause the valve 48 to open and release compressed air into the cylinder 90. The bar 88 will be forcibly moved outwardly against one of the bottles aligned therewith. The bottle will be struck with a sufficient force to propel the bottle off of the conveyor 12 and between the surfaces 72 and 74.

As a further alternative, the embodiment 100 of FIGURE 4 may be employed. This embodiment 100 is similar to the preceding one in that it includes a percussive bar 102 carried by a pair of parallel guides 104 and 106. However, the percussive bar 102 is connected to the armature 108 in solenoid 110. The solenoid 110 is connected with the detector 26 similar to the solenoid 50. Thus, each time the detector 26 produces a signal the solenoid 110 will be energized so as to propel the bottle into the spaces between the surfaces 72 and 74.

As a further alternative, the embodiment of FIGURE 5 may be employed. This embodiment is similar to the embodiment of FIGURE 1 in that it also includes a primary conveyor 120 and a secondary conveyor 122. The second conveyor 122 is angularly disposed with respect to the first conveyor 120 and terminates adjacent an intermediate point in the first conveyor 120.

The first conveyor 120 includes a pair of side rails 124 and 126 that are separated from each other by a predetermined space. An endless belt 128 is disposed in the space between the side rails 124 and 126 so as to form a work surface 128. This surface is substantially horizontal and is adapted to carry a series of workpieces such as bottles 1 in substantially vertical positions.

The second conveyor 122 may be similar to the first conveyor 120 in that it includes a pair of spaced side rails with a belt 136 disposed therebetween. The belt 136 forms a substantially horizontal work surface 138 for carrying workpieces. One end of the work surface 138 is disposed adjacent to the first conveyor 120 and is driven by a motor 140 and gear train 142 so as to move away from the first conveyor 120.

A separating or sorting station 144 similar to the corresponding station in the first embodiment may be disposed adjacent the primary conveyor 120 in substantial alignment with the second conveyor 122. This station 144 includes a detector similar to the detector 26 in the first embodiment. More particularly, the station 144 includes a detector 146 having a photoelectric cell 148 which is adapted to scan the bottles 1 for a particular characteristic as they are carried by the primary conveyor 120. Each time a bottle 1 having the particular characteristic moves past the photoelectric cell 148, an electrical signal will be produced. The separating station 144 also includes means for transferring the bottles from the primary conveyor 120 onto the second conveyor 122 each time an electrical signal is produced.

The transfer means may employ a pneumatic jet similar to the jet 42 of FIGURE 1. However, in the present embodiment it includes a pneumatic cylinder 150 mounted on the side of the detector 146 adjacent to the conveyor 120. A piston provided within the cylinder 150 moves axially thereof at a high rate of speed when compressed air is forced into the cylinder 150. A piston rod is interconnected with the piston and carries a ram 152 on the outer end thereof. The ram 152 may include a metal cylinder 154 secured directly to the piston rod and having a resilient rubber plug or bumper 156. The bumper 156 is normally positioned so as to hit the bottle at or near the center of percussion whenever compressed air is admitted into the cylinder. The resultant impact will propel the bottle from the primary conveyor along a predetermined path toward the secondary conveyor.

In order to control the admission of air into the cylinder 150, a suitable solenoid actuated air valve 158 is provided. This valve 158 is pneumatically interconnected between the cylinder 150 and a source of compressed air. The solenoid is interconnected with the detector 146 and is responsive to the predetermined electrical signal. Thus, the cylinder 150 will be energized each and every time a bottle 1 having the preselected characteristic moves past the photocell 148.

Catching means may be positioned adjacent the secondary conveyor 122 so as to catch the bottles 1 as they are propelled from the primary conveyor 120 and place them on the secondary conveyor 122. Although this catching means may be of any desired variety, in the present instance it includes sets of pulleys 160 and 162 on each side of the secondary conveyor 122. These pulleys correspond to pulleys 64, 66, 68 and 70 in the embodiment of FIGURE 1.

A belt 168 may be provided on each set of pulleys. The belts will thus form a pair of registering surfaces 172 on the opposite sides of the work surface 138. The pulleys 160 and 162 are disposed adjacent the conveyor 126 and are separated by a distance that will insure their engaging the opposite sides of bottles disposed on the secondary conveyor 122. These belts 168 may be single, wide members or pairs of members similar to the belts 56 and 62 in the first embodiment. However, in this embodiment, the two belts 168 are positioned vertically so that the registering surfaces 172 will engage the bottle 1 on the opposite sides immediately adjacent to the enlarged base 2. The tensions in the two belts 168 are adjusted so that the bottles 1 will be supported and carried by the belts 168.

It will be noted that the belts 168 will support the bottles 1 only at their bases 2. This will be effective to retain a bottle 1 in its vertical position as it is being carried by the belts 168. However, when a bottle 1 is propelled from the first conveyor 120 and into the space between the belts 168, there may be a tendency for the bottle 1 to be upset. Accordingly, at the input end of the catching means, additional support may be provided. This will be effective to stabilize the bottle 1 at the time it is being caught.

The stabilizing may be accomplished by second belts similar to the belts 54 and 56 in the first embodiment. However, in the present instance, each of the pulleys 162 includes an enlarged drum or cylinder 180. These drums 180 include a pair of registering surfaces 182 that are separated by a distance that will be effective to catch the bottles 1 therebetween. The outside diameter of the drums 180 are preferably the same as the outside diameters of the pulleys. As a result, all of the surfaces 172 and 182 will have identical peripheral velocities.

The belts 168 and the drums 180 are all interconnected with the drive motor 140 so that their motions will all be synchronized. The surfaces 172 and 182 are driven at the same velocity as the velocity of the work surface 138 on the second conveyor 122. As a result, there will be no relative velocity between the conveyor 122 and a bottle 1 carried by the belts 168.

When a bottle 1 is propelled from the primary conveyor 122, it will impinge upon the surfaces 182 of the drums 180 and belts 168 and become trapped therebetween. The belts 168 will be effective to catch the bottles 1 adjacent their enlarged base portions 2. The drums 180 will be effective to catch the bottles 1 adjacent the enlarged portions 3, irrespective of the height of the bottle 1. The bottles 1 will thus be caught at their tops and bottoms for a sufficient period of time to prevent their rotating out of the vertical position.

As soon as a bottle 1 has been stabilized in a vertical position, the upper end will be released from between the two drums 180 so that the bottle 1 will then be carried at its base 2 by the belts 168. Normally, the bottles 1 will be substantially vertical at this point. However, under some circumstances they may be canted or upset similar to bottles 1b and 1c.

In order to eliminate the canting and right the bottles 1, it has been found desirable for the path followed by the belts 168 to converge toward the work surface 138 on the secondary conveyor 122. Initially, the bottles 1 supported between the belts 168 will be spaced vertically above the conveyor 122 at the time they are caught. However, as they are carried along by the belts 168 they will gradually converge toward the work surface 138 and be forced thereagainst. The bottles 1 will then be seated upon the conveyor substantially normal to the work surface 168.

The foregoing relationship may be obtained by placing the belts 168 in an inclined or non-horizontal position. However, in the present instance the conveyor 122 includes a ramp section 184. This section 184 includes an inclined support 186 that fits beneath the conveyor 122 and causes the work surface 168 to slope upwardly toward the pulleys 160. The front end of the ramp is positioned slightly below the path that the bottom 2 of the bottles 1 will follow.

It may thus be seen that in operation if a bottle 1a having the preselected characteristic is carried by the primary conveyor 120, it will pass the photoelectric cell 148 and produce an electrical signal. This signal will actuate solenoid valve 158 and energize the cylinder 150. The ram 152 will then be rapidly extended so that the bumper 156 will strike the preselected bottle 1a and propel it from the primary conveyor 120 and toward the belts 168 and drums 180. Normally, the bottles 1 will move substantially in translation. However, under some circumstances it may have some rotation and become tilted similar to bottle 1b. The enlarged bottom portion 2b and the enlarged upper portion 3b of this bottle will engage the two belts 168 and drums 180 and become trapped therebetween. This will prevent the bottle 1b rotating further out of its vertical position. As soon as the bottle has been stabilized in a vertical position, the enlarged portion 3b will pass through the two drums. The bottle will then be supported near its base by the two belts 168 similar to the bottle 1c.

It should be noted that up to this point, the bottle 1 may still be slightly cocked or inclined and the base 2 may be spaced from the work surface 138 or the conveyor 122. However, as the bottle 1c is carried by the belts 168 the base 2 will gradually converge with and engage the work surface 138. As the belts 168 gradually force the bottom of the bottle toward the conveyor belt 136, the bottom 2 will completely contact the work surface 138 and become substantially normal to the plane of the work surface 138. When the belt 136 and bottle 1e have traveled over the top of the ramp 184, the bottle will be moved into a vertical position similar to bottle 1e. The bottle while in this vertical position will be carried beyond the ends of the two counter-rotating belts 168 and be released so that it will be carried entirely by the conveyor belt 168 similar to the bottle 1f.

It may thus be seen that the bottles 1 may be transferred from the primary conveyor at a high rate of speed, for example, on the order of 1,000 bottles per minute or higher. Normally, the bottles will be transferred in an upright position. However, in the event the bottles do tend to become upset, they will be caught or trapped by the counter-rotating belts 168 and drums 180 and restored to an upright position before being released on the secondary conveyor 122.

While only a limited number of embodiments of the present invention have been disclosed and described herein, it will be readily apparent to persons skilled in the art that numerous changes and modifications may be made without departing from the scope of the invention. For example, the conveyor system 10 may be employed for handling any desired type of workpiece. Also, the detector 26 be of any desired variety for detecting any desired characteristics in the workpieces. The means for propelling the workpieces may be a blast of air, a ram or any other type of equivalent structure. The means for catching the workpieces may include a set of parallel belts, a pair of counter-rotating wheels or the equivalent. It is also apparent that the catching means such as the belts 56 and 58 and 70 and 72 may be adapted to carry the workpieces to a subsequent station without employing a conveyor such as conveyor 32 or 122. Accordingly, the foregoing disclosure and description thereof are for illustrative purposes only and do not in any way limit the invention which is defined only by the claims which follow.

What is claimed is:

1. A device of the class described for transferring a workpiece from a first conveyor extending along a first path toward a first particular location to a second predetermined path extending toward a second particular location, said device including the combination of:
    a separator disposed in proximity to said first conveyor for propelling the workpiece from the first conveyor along the second path,
    a pair of counter-rotating belts disposed in proximity to said location,
    a pair of registering surfaces on said belts disposed on the opposite sides of the path to capture workpieces propelled from the separator and carry the workpieces along said path,
    a second conveyor having a work surface for carrying the workpieces, said work surface being disposed adjacent the belts and at an angle thereto so as to gradually engage the workpieces as they are being carried by the belts, and
    drive means interconnected with the belts and the conveyor for driving them whereby the two registering surfaces and the work surface will be moving together in the same direction at the same velocity.

2. A device of the class described for transferring a workpiece from a first conveyor to a second conveyor, said device including the combination of:
    a separator disposed in proximity to said first conveyor for propelling the workpiece from the first conveyor,
    a pair of counter-rotating belts disposed in proximity to said location and having a pair of registering surfaces substantially disposed on the opposite sides of the path, said surfaces being positioned to capture the workpieces propelled from the separator,
    drive means interconnected with the belts for driving them at a particular velocity and along a particular line, and
    a second conveyor having a work surface for carrying the workpieces along a second direction, said conveyor being arranged to position a section of the work surface adjacent the belts and along a line that converges with the first particular line, and said drive means being interconnected with the second conveyor for driving said conveyor at said particular velocity whereby the workpieces carried by the belts will be gradually forced against the work surface.

3. A device of the class described for transferring a workpiece from a first conveyor extending along a first path toward a first particular location to a second predetermined path extending toward a second particular location, said device including the combination of:

a separator disposed in proximity to said first conveyor for propelling the workpiece from the first conveyor along the second path, a pair of belts disposed in proximity to said location and having a pair of registering surfaces disposed on the opposite sides of the path to capture workpieces travelling along the second path, said belts being counter-rotatable so that the surfaces will carry said workpieces therebetween along a particular direction, a second conveyor having a work surface for carrying the workpieces, said work surface including a section disposed adjacent the belts, said section being movable for carrying the workpieces along a second direction that converges with the first direction so that the workpieces carried by the belts will be forced against the work surface, and drive means interconnected with the belts and second conveyor for synchronously driving the two registering surfaces and the work surface at the same velocity.

4. A transfer mechanism for workpieces having at least two opposite sides, including:

a conveyor for transporting the workpieces, first means disposed adjacent said conveyor and responsive to a particular characteristic in the workpiece to produce a control signal during the transport of the workpieces by the conveyor, second means disposed adjacent the conveyor and interconnected with said first means to propel along a particular path displaced from the conveyor the workpieces having the particular characteristic each time that one of the control signals occurs, third means for driving the conveyor, a first member movable in a direction having a component along the particular path for engaging one of the opposite sides of the workpieces propelled from the conveyor, a second member displaced from the first member in a direction transverse to the particular path and by a distance to engage the other of the opposite sides of the workpieces propelled from the conveyor, means operative in conjunction with the first and second members for catching and directing along the particular path the workpieces propelled from the conveyor, and means for driving the first member in the direction having the component along the particular path.

5. A transfer mechanism for workpieces having a bottom surface and at least two opposite sides, including:

a first conveyor for receiving the bottom surfaces of the workpieces and transporting the workpieces along a first path, first means disposed relative to said first conveyor and responsive to a particular characteristic in the workpieces to produce a control signal each time that a workpiece having the particular characteristic is transported by the first conveyor, second means disposed relative to the first conveyor and interconnected with said first means to propel the workpieces having the particular characteristic from the first conveyor and along a particular path each time that one of the control signals occurs, a second conveyor disposed relative to the first conveyor to receive the bottom surfaces of the workpieces for transporting along the particular path the workpieces from the first conveyor, a pair of members disposed in displaced relationship to the conveyor and having a pair of registering surfaces disposed with a major component along the particular path in a spaced relationship corresponding to the two opposite sides of the workpieces to catch at the two opposite sides the workpieces propelled along the particular path by the second means, at least a particular one of the members in the pair being movable in a direction having a major component along the particular path, and drive means interconnected with at least the particular one of said members in said pair for causing the particular one of the members to move in the direction having the major component along the particular path to facilitate the movement of the workpiece from the conveyor and along the particular path.

6. A transfer mechanism for workpieces having a bottom surface and at least two opposite sides, including:

a first conveyor receiving the bottom surfaces of the workpieces and for transporting the workpieces along a first particular path, means for driving the conveyor along the first particular path, first means disposed relative to said conveyor and responsive to a particular characteristic in the workpieces to produce a signal each time that a workpiece having the particular characteristic is transported by the conveyor past the first means, second means disposed relative to the conveyor and interconnected with said first means to propel the workpieces having the particular characteristic from the conveyor and along a second particular path different from the first particular path each time that one of the signals is produced, a second conveyor for receiving the bottom surfaces of the workpieces propelled from the first particular path to transport along the second particular path the containers propelled from the first particular path, means for driving the second conveyor along the second particular path, a pair of members disposed adjacent the conveyor and having a pair of registering surfaces disposed on the opposite sides of the second particular path to receive the opposite sides of the workpieces propelled from the first particular path, said registering surfaces being separated by a sufficiently small space corresponding to the distance between the opposite sides of the workpieces and being provided with resilient characteristics to catch the workpieces propelled along the second particular path by the second means, at least a particular one of the members being movable in a direction having a major component corresponding to the particular path, and drive means interconnected with said particular one of the members for causing the particular one of the members to move in the direction having the major component corresponding to the particular path.

7. The transfer mechanism set forth in claim 6 wherein the second conveyor is driven at a different speed than the first conveyor.

8. A transfer mechanism for workpieces having a bottom surface and at least two opposite sides, including:

a first conveyor for receiving the bottom surfaces of the workpieces and for transporting the workpieces along a particular path, means for driving the first conveyor along the particular path, detector means disposed relative to said conveyor and responsive to a particular characteristic in the workpieces to produce a particular signal each time that a workpiece having the particular characteristic is transported past the detector means, transfer means disposed adjacent the conveyor and interconnected with said detector means and responsive to said signals to propel from the conveyor and along a second particular path different from the first particular path the workpieces having the particular characteristic each time that one of the particular signals is produced by the detector means, a second conveyor movable in the second particular direction to receive the bottom surface of the workpieces, the second conveyor being inclined upwardly for a particular distance to stabilize the workpieces propelled from the first conveyor along the second particular path, means for moving the second conveyor along the second particular path, a pair of members disposed relative to the second conveyor and having a pair of registering surfaces separated from each other along the second particular path by a distance corresponding to the distance between the two opposite surfaces of the workpieces to catch the opposite sides of the workpieces propelled along the second particular path by the transfer means, at least a particular one of the members being movable in a direction having a major component in the second particular direction, and means for moving the particular one of the members in the direction having the major component in the second particular direction.

9. A transfer mechanism for workpieces having a bottom surface and two opposite sides, including:

a conveyor for receiving the bottom surfaces of the workpieces and for moving the workpieces in a first particular direction, means for moving the conveyor in the first particular direction, detector means disposed adjacent said first conveyor and responsive to a particular characteristic in the workpieces to produce a control signal each time that a workpiece having the particular characteristic is transported by the first conveyor past the detector means, transfer means disposed adjacent the conveyor and interconnected with the detector means to propel from the conveyor and along a second particular path different from the first particular path the workpiece having said particular characteristic, an active catcher disposed adjacent the conveyor and along said particular path for catching the workpieces propelled along the second particular path by the transfer means, the active catcher including first and second members spaced from each other by a distance corresponding to the distance between the two opposite sides of the workpieces, the first and second members being disposed to receive the two opposite sides of the workpieces and at least one of the members being made from a resilient material to receive the workpieces, a particular one of the members being movable in a direction having a major component corresponding to the second particular direction, and means for driving the particular one of the members in the direction having the major component corresponding to the second particular direction.

10. The transfer mechanism set forth in claim 9, including:

a second conveyor movable in the second particular direction and disposed to receive the bottom surfaces of the workpieces propelled in the second direction by the transfer means, means for moving the second conveyor in the second particular direction, and means included in the second conveyor and disposed adjacent the active catcher and having an inclined surface to stabilize the workpieces upon the transfer of the workpieces from the first conveyor to the second conveyor.

11. A transfer mechanism for transferring workpieces to a first location or to a second location, said mechanism including the combination of:

a primary conveyor extending toward the first location for transporting the workpieces to the first location, means for driving said conveyor at a first velocity whereby the workpieces will be transported along the conveyor at that velocity, detector means disposed relative to said first conveyor to sense the passage of workpieces having a particular characteristic and produce a signal each time that a workpiece having said particular characteristic is transported past the detector means, transfer means disposed adjacent the first conveyor and operatively interconnected with the detector means to propel workpieces having said particular characteristic from the conveyor and along a particular path each time one of said signals occurs, a second conveyor disposed adjacent the first conveyor and extending toward the second location along the particular path, an active catcher disposed in line with the particular path for catching the workpieces propelled along the particular path and placing them on the second conveyor for movement with the second conveyor, the catcher having at least one member movable in a direction having a major component corresponding to the particular path, the catcher being displaced from the second conveyor for receiving the workpieces at a position different from the disposition of the workpieces on the second conveyor, means interconnected with the second conveyor for driving the second conveyor along the particular path, and means interconnected with the movable member in the catcher for moving the member in the direction having the major component corresponding to the second particular path.

12. A transfer mechanism for workpieces having a bottom surface and at least a pair of opposite sides, including:

a first conveyor movable in a first particular direction and disposed to receive the bottom surfaces of the workpieces and to transport the workpieces in the first direction, means for driving said conveyor at a first velocity in the first particular direction whereby the workpieces will be transported along the conveyor at that velocity, detector means disposed adjacent said conveyor to scan the workpieces being carried by the conveyor, said detector being responsive to a particular characteristic in said workpieces to produce a particular signal each time that a workpiece having said particular characteristic is transported past the detector, an air jet disposed adjacent the conveyor at a position past the detector means for directing a blast of air across the conveyor to propel workpieces from the conveyor and along a second particular path different from the first particular direction, a source of compressed air, valve means interconnecting said source of compressed air with the air jet, said valve means being interconnected with said detector means and responsive to said particular signal to provide for a blast of air through the jet and against workpieces in accordance with the production of the particular signal by the detector means, a second conveyor disposed adjacent the first conveyor and movable along the second particular path, a pair of members disposed adjacent the second conveyor and having registering surfaces with a spacing less than the distance between the two opposite sides of the workpiece to catch the workpieces propelled along the second particular path by said blast of compressed air, a particular one of the members being movable along the second particular path, the members being disposed to grip the two opposite sides of the workpieces upon the propulsion of the workpieces along the two opposite sides, one of the members being provided with a resilient surface to grip the workpiece, and drive means interconnected with the second conveyor and the particular one of the members for driving the second conveyor and the particular one of the members at a second velocity greater than the velocity of the first conveyor.

13. The transfer mechanism set forth in claim 12 wherein the pair of members constitutes counter-rotating belts and wherein the drive means counter rotates the belts.

14. The transfer mechanism set forth in claim 4 wherein the first member is driven at a different speed than the conveyor.

15. The transfer mechanism set forth in claim 13 wherein means are included on the second conveyor for stabilizing the workpieces to assure that the workpieces are transferred to the second conveyor and are transported by the second conveyor with their bottom surfaces engaging the second conveyor.

16. The transfer mechanism set forth in claim 8 wherein at least one of the members in the pair is resilient and wherein the normal spacing between the first and second members is slightly less than the distance between the two opposite sides of the workpieces.

References Cited by the Examiner

UNITED STATES PATENTS

| 2,689,647 | 9/1954 | Hofstetter et al. | 209—90 |
| 2,817,438 | 12/1957 | Birchall | 209—111.7 |
| 2,977,731 | 4/1961 | Brook et al. | |
| 3,003,629 | 10/1961 | Henderson | 209—74 |
| 3,140,780 | 7/1964 | Richert et al. | 209—74 |

FOREIGN PATENTS

| 536,349 | 1/1957 | Canada. |
| 662,640 | 5/1963 | Canada. |

M. HENSON WOOD, JR., *Primary Examiner.*

ROBERT B. REEVES, *Examiner.*

C. H. SPADERNA, *Assistant Examiner.*